United States Patent [19]

Mizoguchi

[11] Patent Number: 4,638,495
[45] Date of Patent: Jan. 20, 1987

[54] AUTOMATIC ADAPTIVE EQUALIZER

[75] Inventor: Shoichi Mizoguchi, Tokyo, Japan

[73] Assignee: NEC Corporation, Tokyo, Japan

[21] Appl. No.: 601,885

[22] Filed: Apr. 19, 1984

[30] Foreign Application Priority Data

Apr. 19, 1983 [JP] Japan .................. 58-68635

[51] Int. Cl.[4] ................ H03H 7/30; H03K 5/159
[52] U.S. Cl. .......................... 375/14; 333/18; 333/28 R
[58] Field of Search ............ 375/11, 12, 14, 15; 333/18, 28 R; 364/724

[56] References Cited

U.S. PATENT DOCUMENTS

| 3,868,576 | 2/1975 | Bagdasarjanz et al. | 333/28 R |
| 4,003,006 | 1/1977 | Mandeville et al. | 333/18 |
| 4,251,782 | 2/1981 | Bynum | 333/18 |
| 4,330,861 | 5/1982 | Impallomeni et al. | 375/15 |
| 4,333,063 | 6/1982 | Ryu et al. | 333/18 |
| 4,453,256 | 6/1984 | Ryu | 375/15 |

Primary Examiner—Robert L. Griffin
Assistant Examiner—Stephen Chin
Attorney, Agent, or Firm—Sughrue, Mion, Zinn, Macpeak & Seas

[57] ABSTRACT

In order to remove at least one of amplitude and delay distortions which tend to occur during signal transmission, the invention features circuitry wherein a received IF digital signal is fed through an equalizer circuit to a demodulator and wherein the demodulator outputs a series of data and error signals to a control signal generator. The control signal generator produces in-phase and quadrature control signals which are appropriately added and subtracted and subsequently averaged in an adder and subtracter circuit before being applied to a series of equalizers in the equalizer circuit.

4 Claims, 7 Drawing Figures

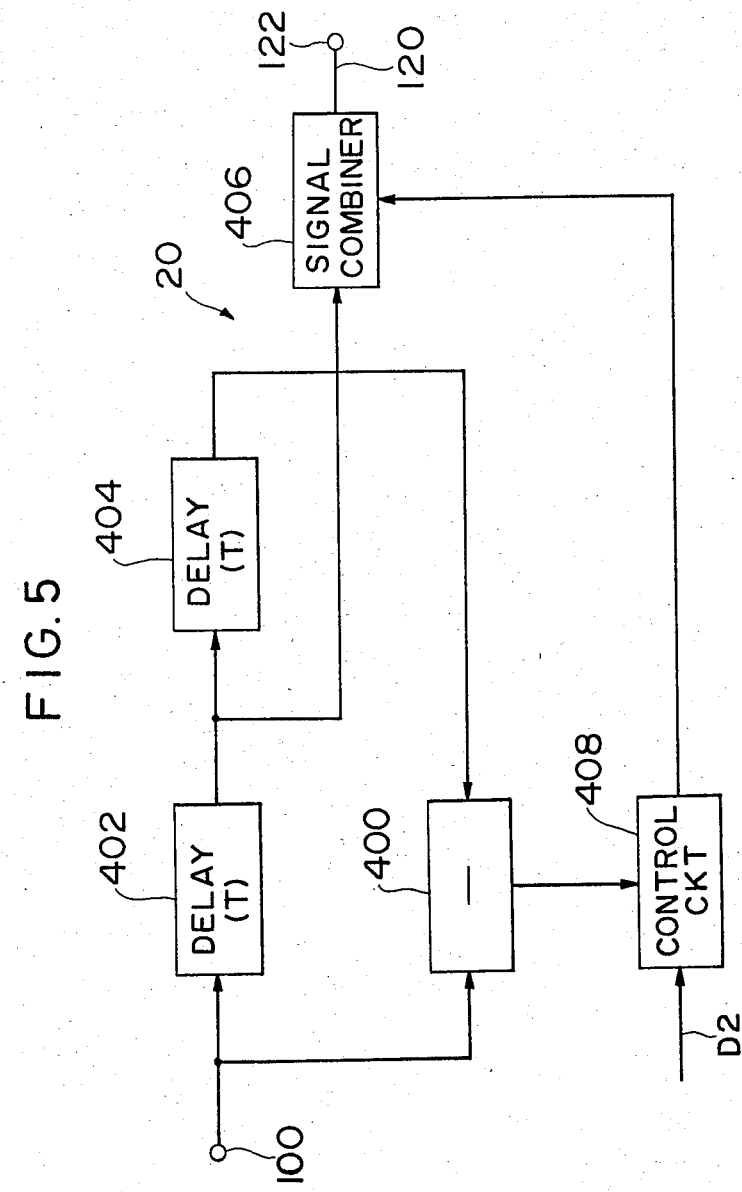

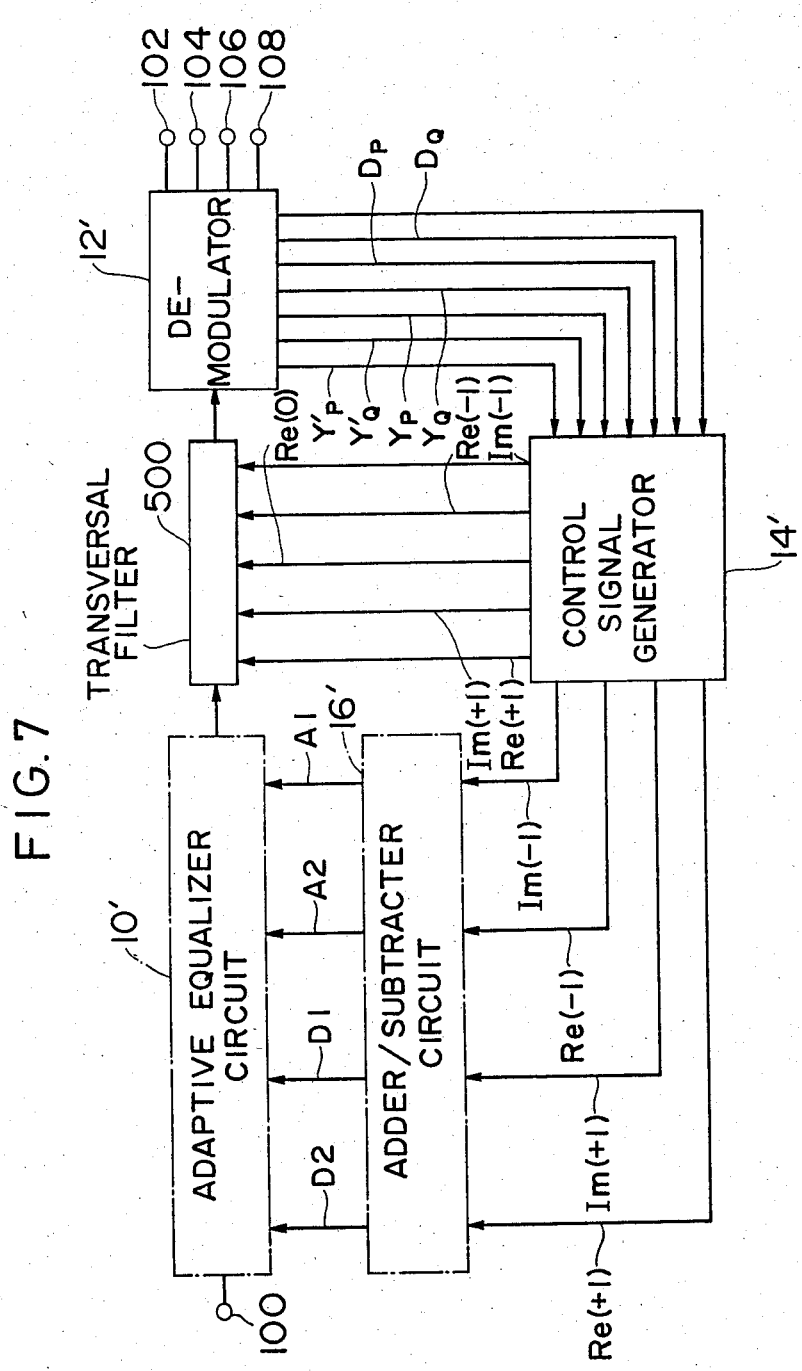

4,638,495

AUTOMATIC ADAPTIVE EQUALIZER

BACKGROUND OF THE INVENTION

1. Field of the Invention

The present invention relates to an automatic adaptive equalizer, and more specifically to such an equalizer featuring improvements in equalizing delay and amplitude distortions of an incoming signal according to control signals obtained from baseband signals.

2. Description of the Prior Art

It is a current practice to provide an equalizer in a digital transmission system for compensating for amplitude and/or delay distortions encountered during signal transmissions. An equalizer for equalizing the amplitude distortion is disclosed in U.S. Pat. No. 4,333,063 assigned to the assignee of this invention. This prior art is arranged to obtain control signals from spectrum of an incoming IF signal, and hence is limited to equalization of amplitude distortions and is unable to equalize delay distortions. Further, this prior art, when combined with a transversal filter so as to further cancel intersymbol interference, it is necessary to independently control the transversal filter and the equalizer for equalizing the amplitude distortions, and resulting in hardware complexity with attendant disadvantages of design difficulties.

SUMMARY OF THE INVENTION

It is therefore a primary object of the present invention to provide an automatic adaptive equalizer wherein both amplitude and delay distortions are adaptively equalized according to control signals obtained from a demodulator.

Another object of the present invention is to provide an automatic adaptive equalizer, which equalizes or conditions at least one of amplitude and delay distortions according to control signals obtained from a demodulator.

Still another object of the present invention is to provide an automatic adaptive equalizer which cancels intersymbol interference and also equalizes at least one of amplitude and delay distortions, according to control signals obtained from a demodulator (viz., baseband signals).

Still another object of the present invention is to provide an automatic adaptive equalizer featuring improvements in equalizing delay, amplitude distortions of an incoming signal through a simple circuit configuration.

In brief these objects are fulfilled by an automatic adaptive equalizer wherein in order to remove at least one of amplitude and delay distortions which tend to occur during signal transmission, there is provided circuitry wherein a received IF digital signal is fed through an equalizer circuit to a demodulator and wherein the demodulator outputs a series of data and error signals to a control signal generator. The control signal generator produces in-phase and quadrature control signals which are appropriately added and subtracted and subsequently averaged in an adder and subtracter circuit before being applied to a series of equalizers in the equalizer circuit.

More specifically, the present invention takes a form of an automatic adaptive equalizer for use in a digital radio transmission system, comprising: a first means for equalizing at least one of amplitude and delay distortions of an incoming IF signal; a demodulator being supplied with the output of the first means, and generating a plurality of data signals and a plurality of error signals; a control signal generator receiving the plurality of data signals and the plurality of error signals, and generating a plurality of in-phase control signals and a plurality of quadrature control signals; a second means for receiving and performing additions and subtractions of selected ones of the in-phase and quadrature control signals, and for applying the results of the addition and subtractions to the first means.

BRIEF DESCRIPTION OF THE DRAWINGS

The features and advantages of the present invention will become more clearly appreciated from the following description taken in conjunction with the accompanying drawings in which like blocks, circuits or signals are denoted by like reference numerals and in which:

FIG. 5 is a block diagram showing one example of a circuit arrangement which is usable as a parabolic delay distortion equalizer shown in FIG. 1;

FIG. 7 is a block diagram showing a second embodiment of an automatic adaptive equalizer according to the present invention.

DETAILED DESCRIPTION OF THE PREFERRED EMBODIMENTS

Figure 1:
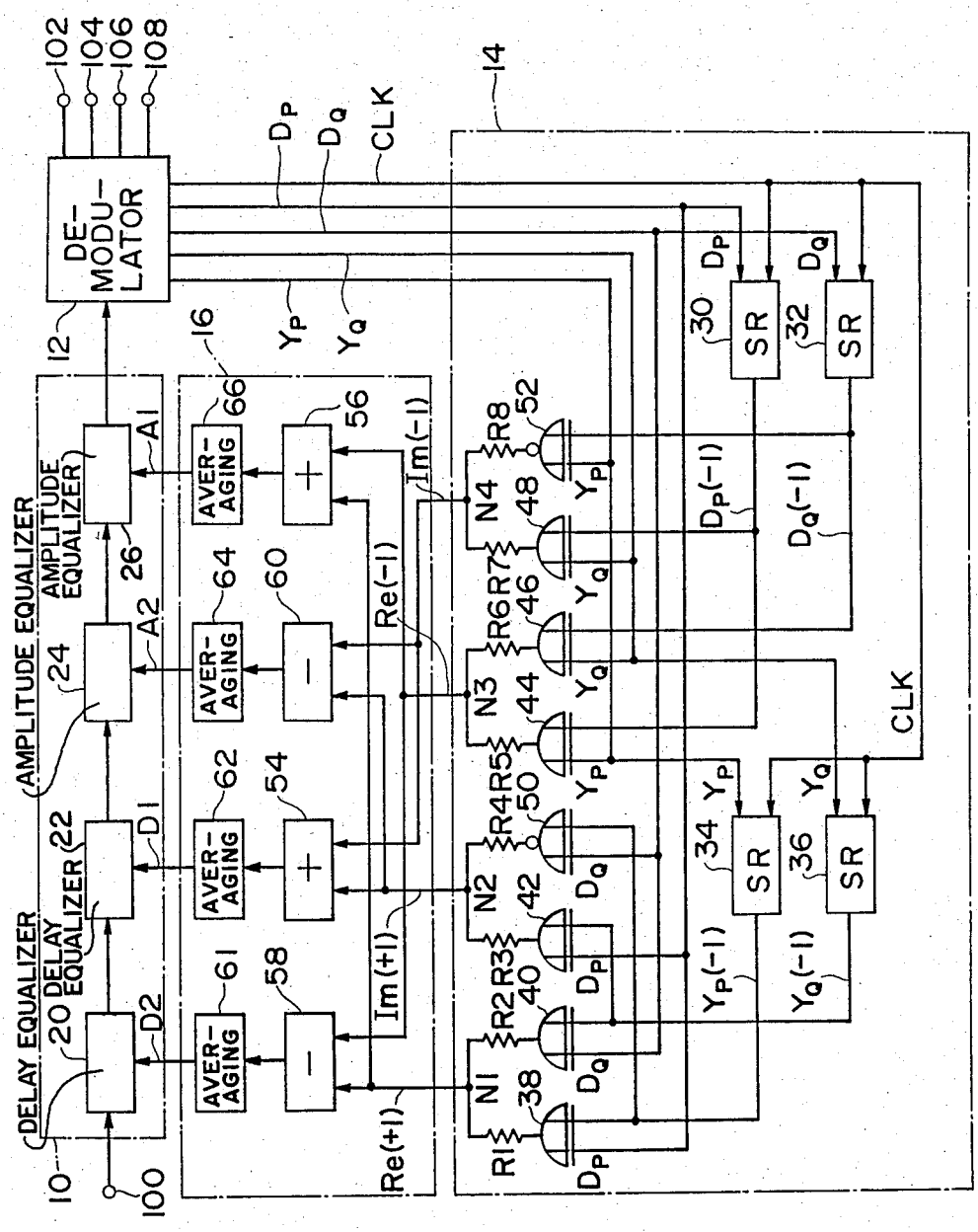
FIG. 1 is a block diagram showing a first embodiment of an automatic adaptive equalizer according to the present invention.

Reference is now made to FIG. 1, which shows in block diagram form a first embodiment of the automatic adaptive equalizer according to the present invention. The FIG. 1 arrangement generally comprises an adaptive equalizer circuit 10, a demodultor 12, a control signal generator 14 and an adder/subtracter circuit 16.

The adaptive equalizer circuit 10 includes four equalizers arranged to compensate for delay and amplitude distortions of an incoming IF (Intermediate Frequency) signal applied thereto via an input terminal 100. More specifically, the four equalizers of the circuit 10 are a parabolic (or second-order) delay distortion equalizer 20, a linear delay distortion equalizer 22, a linear amplitude distortion equalizer 24 and a parabolic amplitude equalizer 26. The demodulator 12 includes, although not shown, a phase detector, a level discriminator, an error signal generator, a clock synchronizer, etc. The control signal generator 14 comprises shift registers 30, 32, 34 and 36, exclusive-OR gates 38, 40, 42, 44, 46 and 48, and exclusive-NOR gates 50 and 52, and resistors R1, R2, R3, R4, R5, R6, R7 and R8, all of which are coupled as shown. On the other hand, the adder/subtracter circuit 16 includes adders 54, 56, subtracters 58, 61, and averaging circuits 61, 62, 64 and 66. Each of the latter mentioned circuits may take the form of an integrator.

The adaptive equalizer circuit 10 is supplied with the IF signal via the terminal 100, and conditions or compensates for the linear and parabolic delay distortions of the incoming IF signal in the equalizers 22 and 20, respectively, and further compensates for the linear and parabolic amplitude distortions of the incoming IF signal in the equalizers 24 and 26, respectively. The delay and amplitude equalizations in the equalizers 20, 22, 24 and 26 are controlled by control signals D2, D1, A2 and A1, respectively, which are applied from the adder/subtracter circuit 16. The circuit 10 supplies the output thereof to the demodulator 12, which outputs demodulated signals (digital signals) over lines 102, 104, 106 and 108 and which also outputs data signals Dp, Dq, error signals Yp, Yq, and clocks (CLK) for use in equalizing the aforementioned distortions of the incoming signal. The signals Dp, Dq, Yp, Yq, and clocks CLK are applied to the control signal generator 14.

The shift registers 30 and 32 are respectively supplied with the data signals Dp and Dq in addition to clocks CLK, and thence respectively generate data signals Dp(−1) and Dq(−1), wherein (−1) denotes a delay by one bit relative to the corresponding incoming data signal. Similarly, the shift registers 34 and 36 respectively receive the error signals Yp and Yq with clocks CLK, and thence respectively generate error signals Yp(−1) and Yq(−1), wherein (−1) denotes a delay by one bit relative to the corresponding incoming error signal. While, the data signal Dp is directly applied to the exclusive OR gates 38 and 42, and, the other data signal Dq directly to the exclusive OR gate 40 and the exclusive NOR gate 50, as shown in the drawing. Similarly, the error signal Yp is directly applied to the exclusive OR gate 44 and the exclusive NOR gate 52, and, the other error signal Yq directly to the exclusive OR gates 46 and 48. The outputs of the gates 38 and 40 are added at a node N1 and applied to the subtracter 58 as an in-phase control signal Re(+1), while the outputs of the gates 42 and 50 are added at a node N2 and applied to the adder 54 as a quadrature control signal Im(+1). Similarly, the outputs of the gates 44 and 46 are added at a node N3 and applied to the subtracter 60 as an in-phase control signal Re(−1), while the outputs of the gates 48 and 52 are added at a node N4 and applied to the adder 56 as a quadrature control signal Im(−1). The values of the control signals Re(+1), Im(+1), Re(−1) and Im(−1) are given by following equations(1):

$$\begin{aligned}Re(+1) &= Dp \cdot Yp(-1) + Dq \cdot Yq(-1) \\ Im(+1) &= Dp \cdot Yq(-1) - Dq \cdot Yp(-1) \\ Re(-1) &= Dp(-1) \cdot Yp + Dq(-1) \cdot Yq \\ Im(-1) &= Dp(-1) \cdot Yq - Dq(-1) \cdot Yp \end{aligned} \quad (1)$$

wherein (a) the suffixes (+1) and (−1) attached to Re (and Im) respectively denote that the data signal Dp is advanced and delayed by one bit relative to the error signal Yp, and (b) "·" denotes a logic operation of exclusive OR. The subtracters 58, 60 and the adders 54, 56 generate control signals, respectively, which are respectively averaged in the associated averaging circuits 62, 61, 66 and 64, and which are applied to the adaptive equalizer circuit 10 as the control signals D2, A2, D1 and A1, respectively. The values of the control signals D1, D2, A1 and A2 are given by following equations(2):

$$\begin{aligned}D1 &= Im(+1) + Im(-1) \\ D2 &= Re(+1) - Re(-1) \\ A1 &= Re(+1) + Re(-1) \\ A2 &= Im(+1) - Im(-1) \end{aligned} \quad (2)$$

Figure 2:
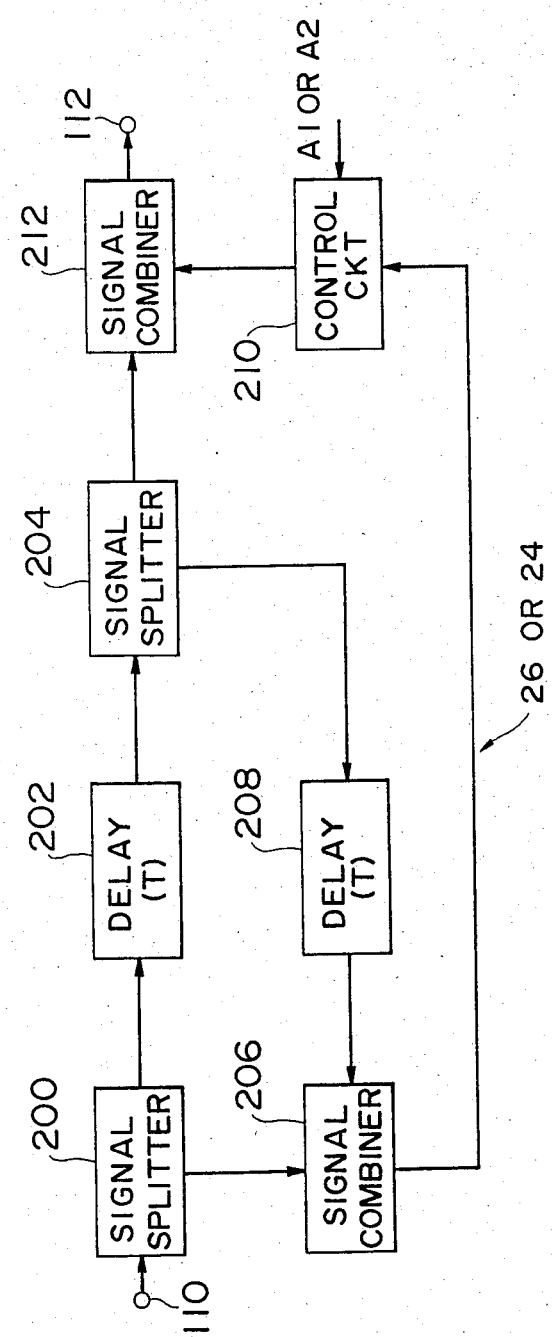
FIG. 2 is a block diagram showing one example of a circuit arrangement which may be used as each of linear and parabolic amplitude distortion equalizers shown in FIG. 1.

FIG. 2 is a block diagram showing one example of a circuit arrangement which may be used as each of the linear and parabolic amplitude distortion equalizers 26 and 24. In the case where the arrangement shown in FIG. 2 is applied to the equalizer 24, an IF input signal is the output of the linear delay equalizer 22. Otherwise, the IF input signal is the output of the equalizer 24. The FIG. 2 arrangement is disclosed in U.S. Pat. No. 4,333,063 assigned to the assignee of the present invention.

In FIG. 2, the IF input signal is fed to a signal splitter 200 via an input terminal 110. The signal splitter 200, along with other signal splitter 204, simply divides the input signal into two outgoing signals. One of the outputs of the splitter 200 is applied via a delay device 202 to the signal splitter 204. The other output of the signal splitter 200 is applied to a signal combining circuit 206. One of the two outputs from the signal splitter 204 is applied to the combining circuit 206 via a delay device 208, the delays in the delay devices 202 and 208 being identical. The signal combiner 206 generates a sum signal which is applied to a control circuit 210 which controls the amplitude and polarity of the signal applied thereto according to the control signal A1 or A2. The output of the control circuit 210 is applied to one of the inputs of a signal combiner 212, which receives the other output of the signal splitter 204. The output of the signal combiner 212 is the output of the equalizer. Each of the signal splitters 200, 204 and the signal combiners 206, 212 is of well known configuration.

In the arrangment shown in FIG. 2, assuming that the input signal applied to the terminal 100 is $e^{j\omega t}$ and that the output derived from the output terminal 102 is $S_0(t)$, the following equation (3) is given:

$$S_0(t) = (1 + 2a\cos\omega T) \cdot e^{j\omega(t-T)} \quad (3)$$

wherein (a) T denotes the delay (sec) provided in each of the delay devices 202 and 208, (b) $\omega$ is an angular frequency of the input signal, and (c) $a$ is a level control coefficient for controlling the amplitude in the control circuit 210. Accordingly, the transfer function $H(\omega)$ of the equalizer is given by:

$$H(\omega) = 1 + 2a\cos\omega T \quad (4)$$

Consequently, the phase and delay of the output signal remain constant irrespective of the value of the level control coefficient $a$ in that the above mentioned transfer function involves no imaginary component.

In the case where the FIG. 2 arrangement is employed as the linear amplitude distortion equalizer 22, the delay T in each of the delay devices 202 and 208 is set as follows:

$$T = (2m-1)/4f_0$$

wherein (a) $f_0$ denotes a center frequency of the input signal applied to the terminal 110 and (b) m is a positive integer. Accordingly, the transfer function (4) is a function of sine so that an approximately linear slope is obtainable in the vicinity of $f_0$. On the other hand, when the FIG. 2 arrangement is applied to the parabolic amplitude distortion equalizer 20, the the delay T in each of the delay devices 202 and 208 is set as follows:

$$T = m/f_0$$

The transfer function (4) is a function of cosine, whereby an approximately parabolic curve is obtained in the vicinity of $f_0$.

Thus, the linear and parabolic amplitude distortions of an input signal are adaptively compensated for in the equalizers 22 and 20.

Figure 3:
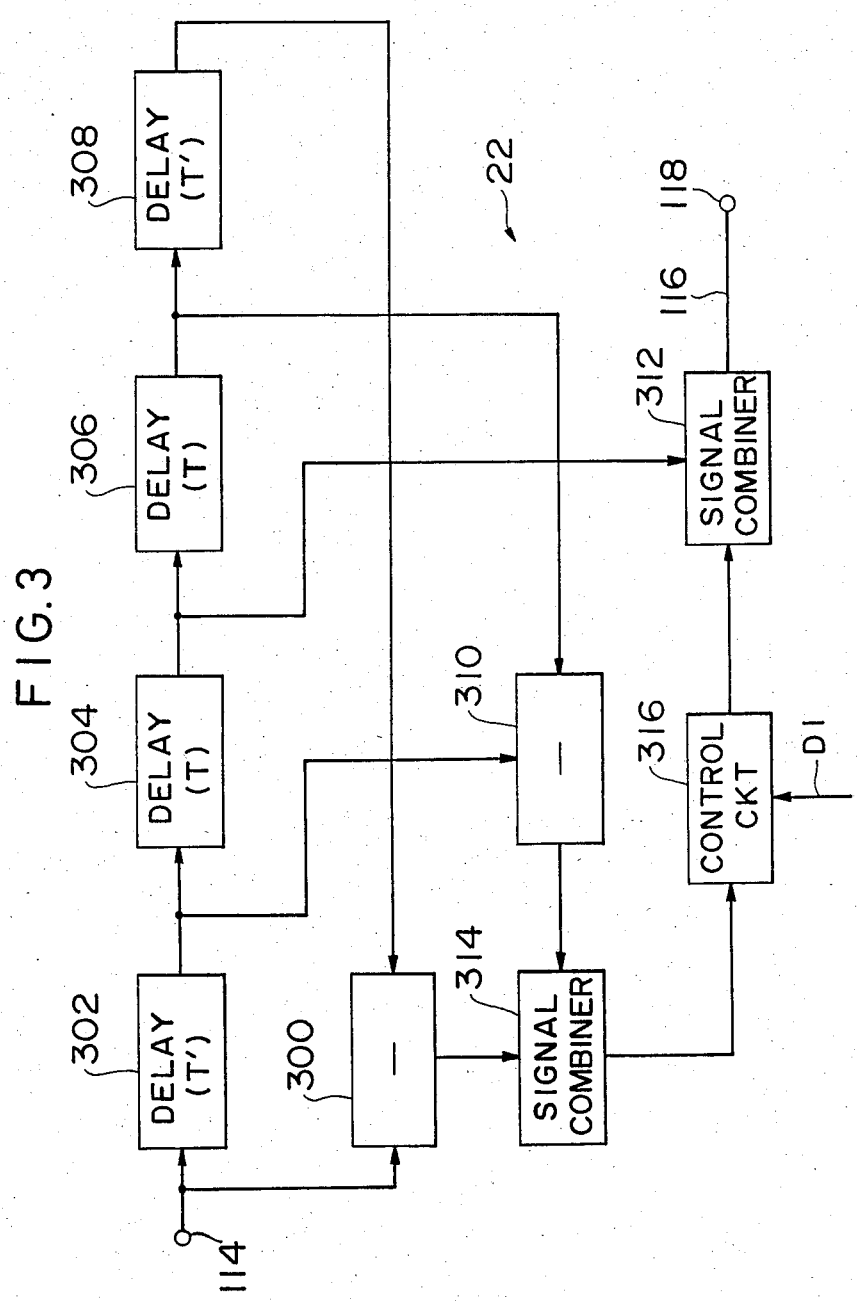
FIG. 3 is a block diagram showing one example of a circuit arrangement which is usable as a linear delay distortion equalizer shown in FIG. 1.

FIG. 3 is a block diagram showing a second example of circuitry which is usable as the linear delay distortion equalizer 22 of FIG. 1. An IF input signal, which is the output of the equalizer 20 shown in FIG. 1, is applied via an input terminal 114 to one input of a first subtracter 300. The IF input signal is also delayed in four delay devices 302, 304, 306 and 308 in tandem, and thence is applied to the other input of the subtracter 300. The delay device 302 applies the output thereof to one input of a second subtracter 310 which receives at the other input the output of the delay device 306. The delay device 304 supplies a signal combiner 312 with the output thereof. Each of the subtracters 300 and 310 performs a subtraction between the amplitudes of the two signals applied. A signal combiner 314 adds the outputs of the subtracters 300 and 310, and applies the output thereof to a control circuit 316 which controls the amplitude and polarity of the signal applied according to the control signal D1. Then, the signal combiner 312 adds the outputs of the circuit 316 and the delay device 304, and outputs the output over a line 116 which is coupled via an output terminal 118 to the input of the equalizer 24.

Assuming that (a) each of the delays provided by the delay devices 302 and 308 is T', and each of the delays by the delay devices 304 and 306 is T, and (b) the amplitude control coefficient at the control circuit 316 is $\alpha$. Then, the transfer function $H(\omega)$ of the FIG. 3 arrangement is represented by:

$$H(\omega) = 1 + j2\alpha(\sin\omega T + \sin\omega T') \quad (5)$$

wherein $T' = T + T$. Therefore, a characteristic function of delay $\tau(\omega)$ is given:

$$\tau(\omega) = -d\theta/d\omega \quad (6)$$

$$= \frac{2\alpha(T\cos\omega T + T'\cos\omega T')}{1 + 4\alpha^2(\sin\omega T + \sin\omega T')}$$

wherein $\theta$ denotes a phase characteristic function obtainable from the equation (5).

Figure 4:
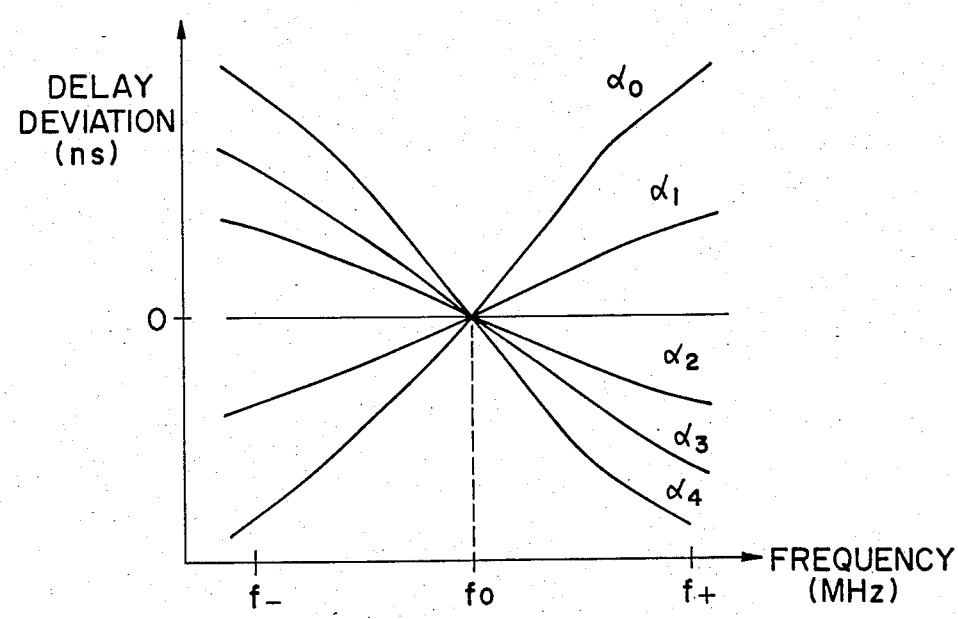
FIG. 4 is a sketch showing delay characteristics for explaining the operation of the arrangement of FIG. 3.

FIG. 4 is a sketch showing delay characteristics obtained using equation (6) in terms of frequency vs. delay wherein the parameter is the amplitude control coefficient $\alpha$. In FIG. 4, $f_-$ denotes a lower frequency which corresponds to a frequency in the vicinity of and higher than the lower band edge of the IF input signal, while $f_+$ denotes an upper frequency which corresponds to a frequency in the vicinity of and lower than the upper band edge of the IF input signal.

FIG. 5 is a block diagram showing one example of circuitry which is usable as the parabolic delay distortion equalizer 20 of FIG. 1. The IF input signal is applied via the input terminal 100 to one input of a subtracter 400. The IF input signal is also delayed in delay devices 402 and 404 in tandem, and thence is applied to the other input of the subtracter 400. The delay device 402 applies the output thereof to one input of a signal combiner 406, and the delay device 404 applies the output thereof to the other input of the subtracter 400. The subtracter 400 performs a subtraction between the amplitudes of the two signals applied, and thence applies the output thereof to a control circuit 408 which controls the amplitude and polarity of the signal applied to the signal combiner 406 according to the control signal D2. The signal combiner 406 adds the outputs of the control circuit 408 and the delay device 402, and applies an output via line 120 and output terminal 122 to the input of the equalizer 22.

Assuming in the FIG. 5 arrangement that (a) each of the delays provided by the delay devices 402 and 404 is T, and (b) the amplitude control coefficient at the control circuit 408 is $\alpha$. Then, the characteristic function of delay $\tau(\omega)$ is given by:

$$\tau(\omega) = \frac{2\alpha T \sin\omega T}{1 + 4\alpha^2 \sin^2\omega T} \quad (7)$$

Figure 6:
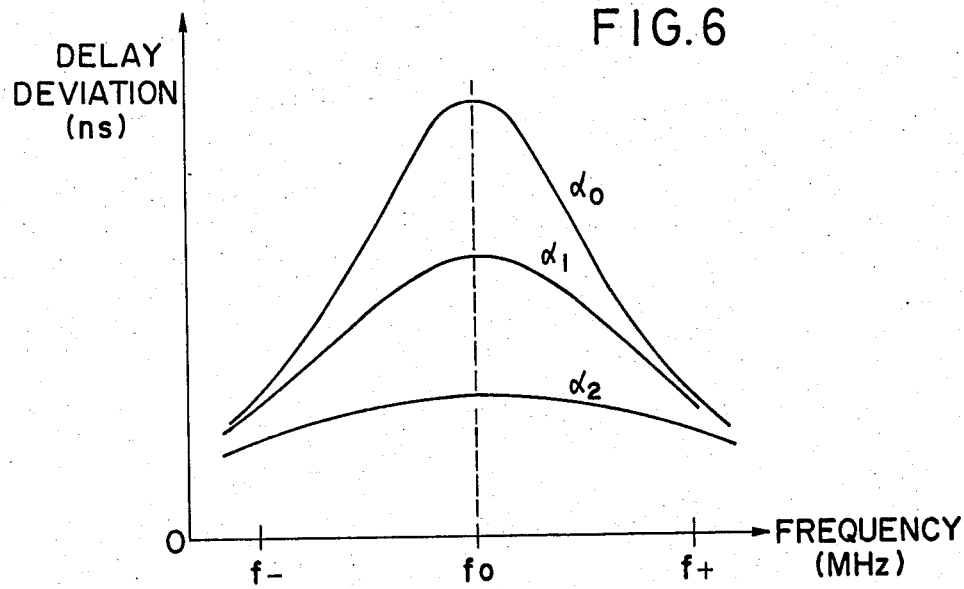
FIG. 6 is a sketch showing delay characteristics for explaining the operation of the arrangement of FIG. 4.

FIG. 6 is a sketch showing delay characteristics of the equation (7) in terms of frequency vs. delay wherein the parameter is the amplitude control coefficient $\alpha$.

FIG. 7 shows in block diagram form a second embodiment of the present invention. This embodiment is directed to the cancellaton of intersymbol interference, plus the equalizations of delay and amplitude distortions which are referred to in connection with the first embodiment.

The FIG. 7 arrangement generally comprises an adaptive equalizer circuit 10', a demodultor 12', a control signal generator 14', an adder/subtracter circuit 16', and a transversal filter 500. As will be appreciated the FIG. 7 embodiment differs from that of FIG. 1 by the inclusion of a transversal filter 500. Accordingly, the blocks 10' and 16' are substantially identical with the blocks 10 and 16 of FIG. 1, respectively. While, the blocks 12' and 14' are similar to the blocks 12 and 14 of FIG. 1, but are modified so as to generate additional error signals Yp', Yq' and control signal Re(0). The arrangements and operations of the demodulator 12', the control signal generator 14' and the transversal filter 500 are described in detail, for example, in Japanese Patent Application No. 56-215271 (laid open under publication No. 58-111519), and hence the details thereof will be omitted for simplicity.

In FIG. 7, the demodulator 12' generates the data signals Dp, Dq, and the error signals Yp, Yq, Yp', Yq', all of which are applied to the control signal generator 14'. The demodulator 12' also outputs the baseband signals over the lines 102, 104, 106 and 108 as previously referred to in connection with FIG. 1. The control signal generator 14' is arranged to generate the control signal Re(0) which is applied to the transversal filter 500. The other control signals Re(+1), Im(+1), Re(−1) and Im(−1) are identical with the corresponding control signals mentioned in the first embodiment, and are applied to the adder/subtracter 16' and also to the transversal filter 500. The portion enclosed by a broken line 502 is already referred to in the first embodiment.

The control signal Re(0) is obtained by similar circuitry by which Re(+1) and Re(−1) are generated, and is represented by:

$$Re(0) = Dp \cdot Yp' + Dq \cdot Yq' \qquad (8)$$

Re(0) is used for controlling a variable tap gain controller (not shown) provided for a main tap of the transversal filter 500. While, Re(−1), Im(−1), Re(+1) and Im(+1) are used to control variable tap gain controllers for the taps preceding and immediately following the main tap.

The principle underlying the present invention will be explained by way of the following equations, wherein (a) the in-phase control signal Re(−1) corresponds to the real component of a tap coefficient C(−1) for a tap which immediately precedes the main tap, (b) the in-phase control signal Re(+1) corresponds to the real component of a tap coefficient C(+1) for the tap immediately following the main tap, and (c) the quadrature control signals Im(−1) and Im(+1) respectively correspond to the imaginary components of the tap coefficient C(−1) and C(+1).

$$C(-1) + C(+1) = \{Re(+1) + jIm(+1)\} \cdot e^{j\omega T} + \qquad (9)$$
$$\{Re(-1) + jIm(-1)\}e^{-j\omega T}$$
$$= \{Re(+1) + Re(-1)\}\cos\omega T -$$
$$\{Im(+1) - Im(-1)\}\sin\omega T + j\{Im(+1) +$$
$$Im(-1)\}\cos\omega T + j\{Re(+1) - Re(-1)\}\sin\omega T$$

$$(1/T) \cdot d(C(-1) + C(+1))/d\omega = \{Re(+1) + Re(-1)\}\sin\omega T - \qquad (10)$$
$$\{Im(+1) - Im(-1)\}\cos\omega T + j\{Im(+1) +$$
$$Im(-1)\}\sin\omega T + j\{Re(+1) - Re(-1)\}\cos\omega T$$

It is apparent from the above that (a) the coefficient of cos$\omega$T (real part) of the equation (9) can be used as the control signal A1, (b) the coefficient of sin$\omega$T (real part) of the equation (9) can be used as the control signal A2, (c) the coefficient of cos$\omega$T (imaginary part) of the equation (10) can be used as the control signal D2, and (d) the coefficient of sin$\omega$T (imaginary part) of the equation (10) can be used as the control signal D1.

The first embodiment shown in FIG. 1 includes the four equalizers 20, 22, 24 and 26. The present invention however is not limited to this arrangement, but is capable of selectively employing one or more than two equalizers on the case-by-case basis considering practical transmission distortions.

The foregoing description shows only preferred embodiments of the present invention. Various modifications are apparent to those skilled in the art without departing from the scope of the present invention which is only limited by the appended claims.

What is claimed is:

1. An automatic adaptive equalizer for use in a digital radio transmission system, comprising:
    a first means for equalizing at least one of amplitude and delay distortions of an incoming IF signal;
    a demodulator being supplied with the output of said first means, and generating a plurality of data signals and a plurality of error signals;
    a control signal generator receiving said plurality of data signals and said plurality of error signals, and generating a plurality of in-phase control signals and a plurality of quadrature control signals; and
    a second means coupled to the output of said control signal generator, said second means performing additions and subtractions of said in-phase and quadrature control signals, and for applying the results of said addition and subtractions to said first means.

2. An automatic adaptive equalizer as claimed in claim 1, further comprising a transversal filter provided between said first means and said demodulator such that the input and output of said transversal filter are coupled to the output of said first means and the input of said demodulator, respectively, said transversal filter being responsive to outputs of said control signal generator.

3. An automatic adapative equalizer as claimed in claim 1, wherein said first means comprises a linear amplitude distortion equalizer, a parabolic amplitude distortion equalizer, a linear delay distortion equalizer, and a parabolic delay distortion equalizer.

4. An automatic adaptive equalizer as claimed in claim 2, wherein said first means comprises a linear amplitude distortion equalizer, a parabolic amplitude distortion equalizer, a linear delay distortion equalizer, and a parabolic delay distortion equalizer.

* * * * *